United States Patent [19]
Kinoshita et al.

[11] Patent Number: 5,601,482
[45] Date of Patent: Feb. 11, 1997

[54] ROD-SHAPED WORKPIECE GRINDER

[75] Inventors: Hideki Kinoshita, Hiroshima-ken; Hisao Ohuchi, Hiroshima, both of Japan

[73] Assignee: Toyo Advanced Technologies Co., Ltd., Hiroshima, Japan

[21] Appl. No.: 559,083

[22] Filed: Nov. 17, 1995

[30] Foreign Application Priority Data

Nov. 18, 1994 [JP] Japan ................................. 6-284927
Nov. 18, 1994 [JP] Japan ................................. 6-284932

[51] Int. Cl.⁶ ............................................. B24B 3/00
[52] U.S. Cl. ........................ 451/246; 451/244; 451/242
[58] Field of Search .......................... 451/242, 244, 451/245, 246, 397, 385

[56] References Cited

U.S. PATENT DOCUMENTS

| | | | |
|---|---|---|---|
| 556,919 | 3/1896 | Cook | 451/246 |
| 1,383,941 | 7/1921 | Harman | 451/246 |
| 2,080,941 | 5/1937 | Hutchinson | 451/242 |
| 2,551,721 | 5/1951 | Borzi | 451/242 |
| 2,799,977 | 7/1957 | Jones et al. | 451/244 |
| 2,801,499 | 8/1957 | Jones | 451/244 |
| 3,574,974 | 4/1971 | Weissing | 451/397 |
| 4,896,461 | 1/1990 | Enosawa | 451/244 |

FOREIGN PATENT DOCUMENTS

| | | |
|---|---|---|
| 52-044491 | 4/1977 | Japan . |
| 63-216662 | 9/1988 | Japan . |
| 6-297316 | 10/1994 | Japan . |

*Primary Examiner*—James G. Smith
*Assistant Examiner*—Dona C. Edwards
*Attorney, Agent, or Firm*— Burns, Doane, Swecker & Mathis, LLP

[57] ABSTRACT

A rod-shaped workpiece W is supported at its circumferential surface by a shoe 14 and a pair of rolls 16 and 17, and is rotated by the rolls 16 and 17. The rod-shaped workpiece W is ground by being abut against a backing plate 19 at its one end by the rotation of the rolls 16 and 17, and put in abrasive contact with a sectionally arch-shaped groove-like circumferential surface 20b of a grinding wheel 20 at its other end surface. A floating plate 37 is provided so that a slight gap takes place is in a guide hole 42 of a housing 36. A sphere 39 supported by a support member 38 is provided in a retaining recess 47 on a rear end surface of the floating plate 37, and the floating plate 37 is swingably supported.

7 Claims, 11 Drawing Sheets

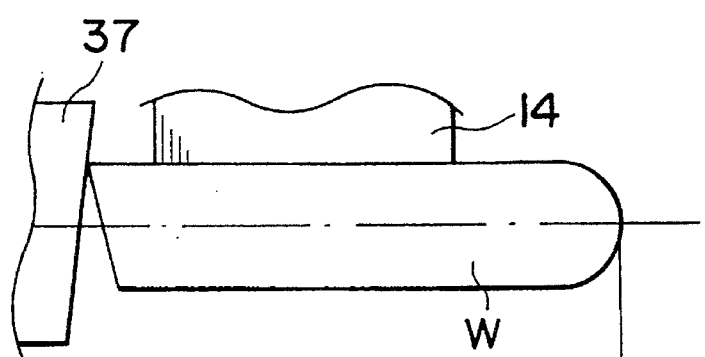
Fig.11A
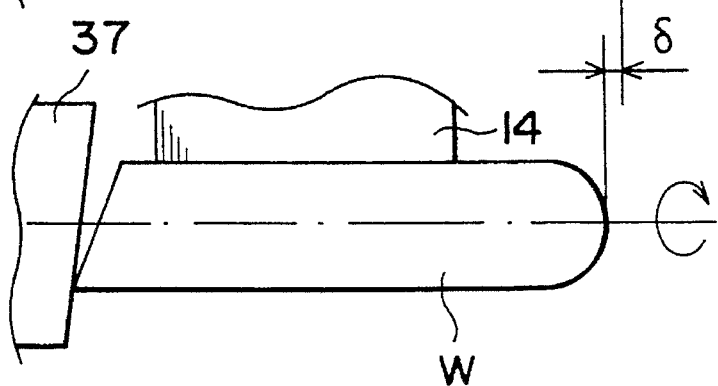
Fig.11B
Fig.12
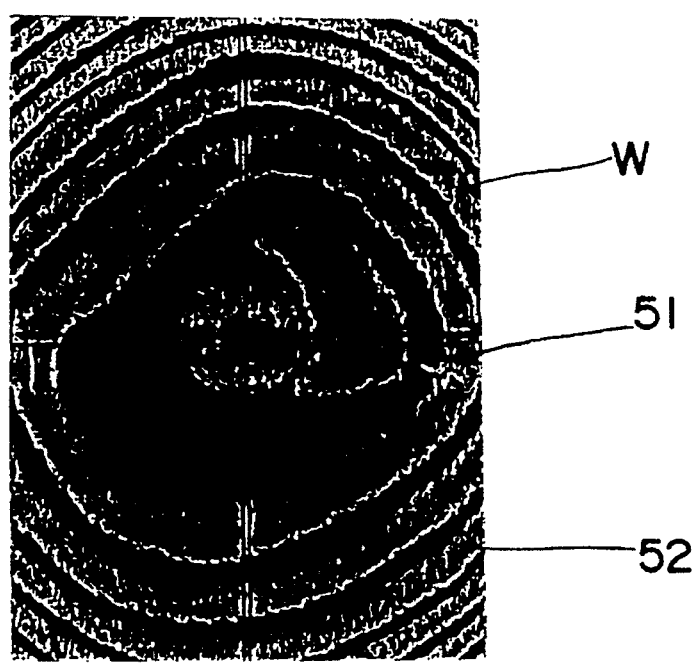

ROD-SHAPED WORKPIECE GRINDER

BACKGROUND OF THE INVENTION

1. Field of the Invention

The present invention relates to a rod-shaped workpiece grinder for use in grinding a front end surface of a very small rod-shaped workpiece into a spherical or flat surface.

2. Description of the Prior Art

In the case of a very small rod-shaped workpiece such as a ferrule (diameter: 2.5 mm, length: 12.7 mm, material: zirconia ceramics) to be used for an optical fiber connector, there is performed transmission of light by making front end surfaces of ferrules abut on each other with an optical fiber having a diameter of, for example, 0.05 mm inserted in a center hole of each of the ferrules. Therefore, the front end surfaces of the ferrules are each processed in a spherical form so that the centers of the optical fibers are correctly aligned with each other and no leak of light is assured.

Conventionally, in grinding the front end surface of such very small rod-shaped workpiece into a spherical surface, a grinder as shown in FIG. 16 has been used.

The grinder is comprised of a diaphragm chuck 1 and a grinding wheel 2. The diaphragm chuck 1 has a structure for supporting and rotating a rod-shaped workpiece W. On the other hand, the grinding wheel 2 has a cup shape and is formed with a grinding surface 2a which inclines inward from its peripheral edge portion. The axial center of the grinding wheel 2 is tilted by a specified angle with respect to the axial center of the rod-shaped workpiece W.

Grinding of the rod-shaped workpiece W by this grinder is performed by holding one end of the workpiece W by the diaphragm chuck 1 to rotate the workpiece W, and putting the rotatively driven grinding wheel 2 in abrasive contact with the other end of the workpiece W.

However, the above-mentioned conventional grinder has the following problems.

Firstly, a desired processing accuracy is hardly obtained. That is, since the diaphragm chuck 1 is used for supporting the rod-shaped workpiece W, a misalignment between the center of rotation of the chuck and the axial center of the rod-shaped workpiece W cannot be eliminated (misalignment amount: 50 µm). Particularly in the case of a ferrule, high-accuracy finish dimensions are required as described above (dimensional accuracy: ±10 µm, R dimension: ±0.5 mm, shape: 0.15 µm, surface roughness: 0.01 µmRa, concentricity: 20 µmTIR), and therefore the influence of the misalignment on the processing accuracy cannot be ignored. Furthermore, since the grinding wheel 2 is put in surface contact with the rod-shaped workpiece W, the finishing accuracy is influenced by the surface roughness and shape of the grinding surface 2a. In addition, a coolant is not smoothly supplied to the grinding surface 2a, and therefore the desired grinding condition cannot be obtained. Furthermore, in the case of spherically grinding the rod-shaped workpiece W, in addition to the shape of the grinding surface 2a, the degree of tilt of a rotary drive shaft of the grinding wheel 2 with respect to the axial center of the rod-shaped workpiece W emerges as a problem, however, angle adjustment for achieving the tilt is difficult.

Secondly, the grinding wheel 2 has a short operating life. That is, as described above, the grinding wheel 2 processes the rod-shaped workpiece W for grinding in surface contact with the rod-shaped workpiece W, and therefore the grinding wheel 2 will be worn away soon. Furthermore, the grinding wheel 2 is set tilt, and therefore the grinding wheel 2 is put in contact with the other portion of the grinder, for example, a mounting portion of the diaphragm chuck 1. Therefore, the outer diameter dimension of the grinding wheel 2 is not allowed to have a value not smaller than a specified value. Therefore, a cycle of replacing the grinding wheel 2 is short.

Thirdly, there are required at least two moving axes to be subjected to an NC control. That is, there are required at least an axis for feeding the grinding wheel 2 for grinding and an axis for tilting the grinding wheel 2, and control therefor is complicated.

Fourthly, there is bad workability. That is, in the stage of mounting and dismounting of the rod-shaped workpiece W to and from the diaphragm chuck 1, an axial movement of the rod-shaped workpiece W, i.e., inserting and pulling of the rod-shaped workpiece W into and out of the diaphragm chuck 1 is required, and therefore a cycle time of 40 to 50 seconds has been required. Furthermore, the tilt angle setting of the axis of rotation of the grinding wheel 2 has been difficult, and this has required much time.

SUMMARY OF THE INVENTION

The present invention has been developed to substantially eliminate the above-described disadvantages.

It is an object of the present invention to provide a rod-shaped workpiece grinder capable of performing spherical or flat surface grinding of the front end of the rod-shaped workpiece with high accuracy in a short time.

Another object of the present invention is to provide a rod-shaped workpiece grinder provided with an inexpensive backing plate having a simple structure for supporting the rod-shaped workpiece so that the front end surface of the workpiece can be ground with high accuracy.

In order to achieve the aforementioned object, there is provided a rod-shaped workpiece grinder comprising:

a shoe which abuts against a circumferential surface of a rod-shaped workpiece supplied in a grinding position;

a pair of rolls which rotatably abut against the circumferential surface of the rod-shaped workpiece, at least one of the rolls being movable to be put in and out of contact with the rod-shaped workpiece, at least one of the rolls being driven to rotate;

a backing plate against which a rear end surface of the rod-shaped workpiece abuts; and a grinding wheel which puts its circumferential surface in abrasive contact with a front end surface of the rod-shaped workpiece by being driven to rotate to grind the front end surface of the rod-shaped workpiece.

Thus, the rod-shaped workpiece supplied into the grinding position is supported at its circumferential surface by the shoe and the pair of rolls. The rod-shaped workpiece is rotated by its circumferential surface by a rotational driving operation of the rolls, and its center of rotation is aligned with the axial center of the rod-shaped workpiece. The rod-shaped workpiece is ground with its rear end surface abutted against and supported by the backing plate and with its front end surface put in line contact with the circumferential surface of the rotating grinding wheel.

Therefore, according to the present invention, the circumferential surface of the rod-shaped workpiece can be supported by the shoe and the pair of rolls which are movable to be put in and out of contact with the rod-shaped workpiece. With the above-mentioned arrangement, supply, grinding and discharge of the rod-shaped workpiece can be performed automatically smoothly, and this obviates the need of the works of mounting and dismounting a workpiece to and from a chuck as in the prior art, thereby allowing an improved workability to be achieved. Furthermore, when grinding a rod-shaped workpiece, the grinding wheel is put in line contact with the workpiece. With the above-mentioned arrangement, supply of coolant to the portion to be ground can be sufficiently achieved, and consequently a good grinding condition can be obtained.

In a preferred embodiment of the present invention, the circumferential surface of the grinding wheel may be formed with a sectionally arch-shaped groove.

Thus, the circumferential surface of the grinding wheel formed with the sectionally arch-shaped groove is put in abrasive contact with the front end surface of the rotating rod-shaped workpiece, so that the front end surface of the rod-shaped workpiece is ground into a spherical surface.

Therefore, according to the above embodiment, the Center of rotation of the rod-shaped workpiece is defined by its circumferential surface, and therefore the misalignment between the axial center and the center of rotation of the rod-shaped workpiece hardly occurs. Therefore, by putting the circumferential surface of the grinding wheel in abrasive contact with the rod-shaped workpiece, the rod-shaped workpiece can be spherically ground so that the axial center and the center of the front end spherical surface of the rod-shaped workpiece are aligned with each other with high accuracy.

Furthermore, the circumferential surface of the grinding wheel is continuously put in line contact with the front end surface of the rod-shaped workpiece, and therefore such eccentric abrasion as in the prior art occurs less during grinding than in the case where they are put in surface contact with each other. Therefore, the supply of coolant can be performed smoothly, so that a good grinding condition can be maintained.

Furthermore, the tilt angle of the rotary shaft of the grinding wheel is not required to be adjusted in contrast to the practice of the prior art, meaning that the grinding process can be started soon merely by adjusting the positional relation between the rod-shaped workpiece and the grinding wheel.

Furthermore, the circumferential surface of the grinding wheel can be made to serve as a grinding surface, and therefore a cycle of dressing and a cycle of replacing of the grinding wheel can be increased, thereby allowing the operating life of the grinding wheel to be prolonged. In particular, by virtue of the construction in which the diameter of the grinding wheel can be increased by providing the grinding wheel separately from the chuck, the above-mentioned effect of prolonging the operating life of the grinding wheel is remarkable.

Furthermore, it is required to effect an NC control only on the axis in which the grinding wheel is reciprocated in the direction perpendicular to its axis of rotation, and therefore the control is simple.

In an another preferred embodiment of the present invention, a grinding wheel center plane which passes through a portion farthest from the circumferential surface and is perpendicular to the axis of rotation of the grinding wheel may be offset by a specified dimension from the axial center of the rod-shaped workpiece.

Thus, the grinding wheel grinds the rod-shaped workpiece with a half of its circumferential surface put in line contact with the front end surface of the rod-shaped workpiece, thereby reducing a grinding resistance. In this case, even if the axial center of the rod-shaped workpiece and the grinding wheel center plane are displaced from each other to some extent, the grinding wheel is surely put in contact with the rod-shaped workpiece at its circumferential surface in a position located apart from the grinding wheel center plane. With the above-mentioned arrangement, the grinding is performed so that the center of the spherical surface of the rod-shaped workpiece to be ground becomes definite as aligned with its axial center.

Therefore, according to the embodiment, the axial center of the rod-shaped workpiece and the center plane of grinding of the grinding wheel are offset each other. Therefore, the center of the ground spherical front end surface becomes definite to allow the center to be aligned with the axial center with high accuracy. Furthermore, since the circumferential surface of the grinding wheel can be utilized half by half, and therefore the cycle of maintenance (dressing or the like) of the grinding wheel can be further increased.

In a still another preferred embodiment of the present invention, it is acceptable to adopt a construction in which an approximately half of the grinding wheel of the second embodiment is removed axially along the vicinity of the grinding wheel center plane. According to this embodiment, a reduction in weight of the grinding wheel can be achieved, and consequently a rotating power therefor can be reduced.

In a preferred embodiment of the present invention, the backing plate comprises:

a housing having a guide cavity;

a floating plate which is arranged inside the guide cavity of the housing with interposition of a small gap, and has a front end surface against which the rear end portion of the rod-shaped workpiece abuts and a rear end surface formed with a support recess portion;

a sphere which is placed in the support recess portion of the rear end surface of the floating plate and operates to swingably support the floating plate; and a support member which is provided inside the housing and operates to support the sphere between the support member and the floating plate.

Thus, when the rod-shaped workpiece is urged toward its rear end by the rotational driving operation of the rolls, its rear end surface abuts against the front end surface of the floating plate. The floating plate swings about the sphere provided on its rear end surface side according to the perpendicularity of the end surface of the rod-shaped workpiece. With the above-mentioned operation, the front end surface of the floating plate and the rear end surface of the rod-shaped workpiece are put in surface contact with each other, and the rod-shaped workpiece rotates together with the floating plate around its axial center.

Therefore, according to the present embodiment, even though the rear end surface of the rod-shaped workpiece is not formed with the desired perpendicularity, the floating plate inclines according to the perpendicularity of the rear end surface and consequently rotates together with the workpiece in a state in which it abuts against the rear end surface. Therefore, such abrasion due to the perpendicularity of the backing plate with respect to the shoe and the partial abrasive contact of the rear end portion of the rod-shaped workpiece with the backing plate as in the prior art does not occur. Therefore, the front end surface of the rod-shaped workpiece does not vary in position in the direction of its axial center, so that the spherical front end surface of the rod-shaped workpiece can be subjected to the grinding process with high accuracy.

In an another preferred embodiment of the present invention, a spring for urging the floating plate in a direction in which the floating plate protrudes from the housing via the support member may be provided inside the housing.

Thus, the floating plate is urged in the direction in which the floating plate protrudes from the housing via the support member by the operation of the spring. The rear end surface of the pressedly inserted rod-shaped workpiece is put in surface contact with the front end surface of the floating plate in an early stage by the urging force of the spring, so that it immediately stabilizes the rotating condition of the rod-shaped workpiece.

Therefore, according to the embodiment, the floating plate is urged in the direction in which the floating plate protrudes from the backing plate body by the operation of the spring. With the above-mentioned arrangement, the floating plate can be put in surface contact with the end surface of the rod-shaped workpiece in the early stage, thereby allowing a preparation time for the grinding process to be reduced.

In a still another preferred embodiment of the present invention, a floating amount adjusting screw which abuts against the rear end surface of the support member and operates to adjust via the sphere a positional relation in the direction of the axial center of the floating plate with respect to the housing may be provided.

Thus, the floating amount adjusting screw adjusts the position of the floating plate, i.e., an amount of swing of the floating plate.

Therefore, according to the embodiment, the amount of swing of the floating plate can be adjusted by means of the adjusting screw. Therefore, the amount of swing can be made to be the necessary minimum amount in conformity to a variation in accuracy of the perpendicularity of the rear end surface of the rod-shaped workpiece, so that the time to the start of the grinding process can be reduced. Particularly, by urging the floating plate in the direction in which the floating plate protrudes by the spring, the time to the start of the grinding process can be further reduced, and the urging force of the floating plate to be exerted on the rod-shaped workpiece can be adjusted, thereby the optimum support condition can be obtained.

BRIEF DESCRIPTION OF THE DRAWINGS

Further objects and advantages of the present invention will become clear from the following description taken in conjunction with the preferred embodiments thereof with reference to the accompanying drawings.

FIGS. 11A and 11B are plane views showing a support condition of a rod-shaped workpiece on the assumption that the backing plate shown in FIG. 10 is fixed;

FIG. 12 is interference fringes showing a grinding finish condition of a rod-shaped workpiece by the grinder on the assumption that the backing plate shown in FIG. 10 is fixed;

DETAILED DESCRIPTION OF THE PREFERRED EMBODIMENTS

First Embodiment

Figure 1:
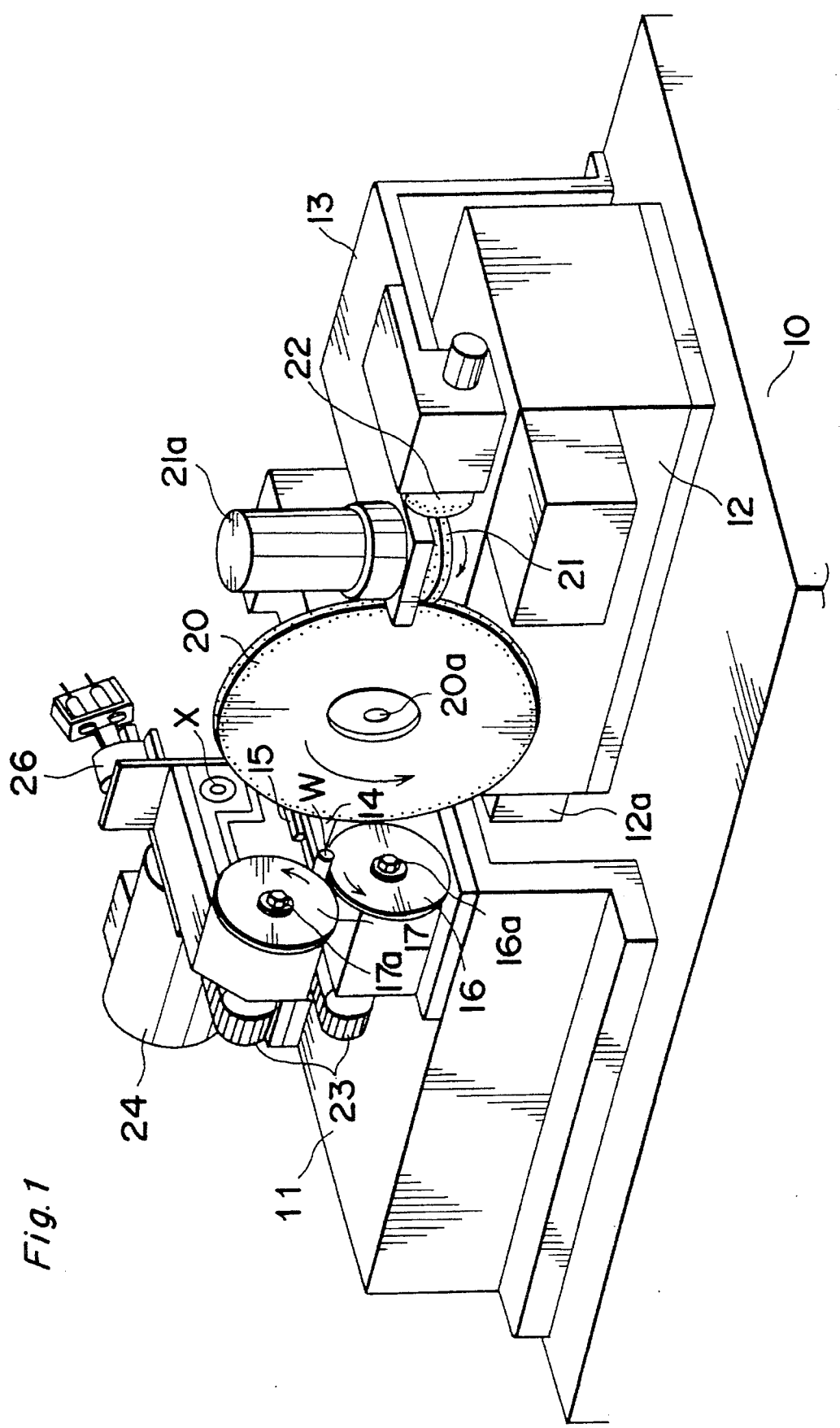
FIG. 1 is a schematic perspective view of a grinder according to a first embodiment of the present invention.

FIG. 1 shows a first embodiment of rod-shaped workpiece grinder according to the present invention. On a bed 10 of the rod-shaped workpiece grinder are provided a workpiece support base 11, a grinding wheel feed base 12, and a dress forming grindstone support base 13. The workpiece support base 11 is provided with a shoe 14, a loading plate 15, a support roll 16, a pressure roll 17, a suction pad mechanism 18 (refer to FIG. 2), and a backing plate 19 (refer to FIG. 4). A grinding wheel 20 is rotatably mounted to the grinding wheel feed base 12, while a dress forming grindstone 21 is rotatably mounted to the dress forming grindstone support base 13. It is to be noted that a reference numeral 22 denotes a dressing grindstone for the dress forming grindstone 21.

The aforementioned shoe 14 abuts against the circumferential surface of a rod-shaped workpiece W so as to position the rod-shaped workpiece W in a processing position A in cooperation with both the rolls 16 and 17.

The aforementioned loading plate 15 is made to slide on the shoe 14 by a drive mechanism such as a solenoid (not shown). The loading plate 15 operates to press the circumferential surface of the rod-shaped workpiece W supplied onto the shoe 14 by its front end surface, so that the rod-shaped workpiece W is supplied into the processing position A.

Figure 3:
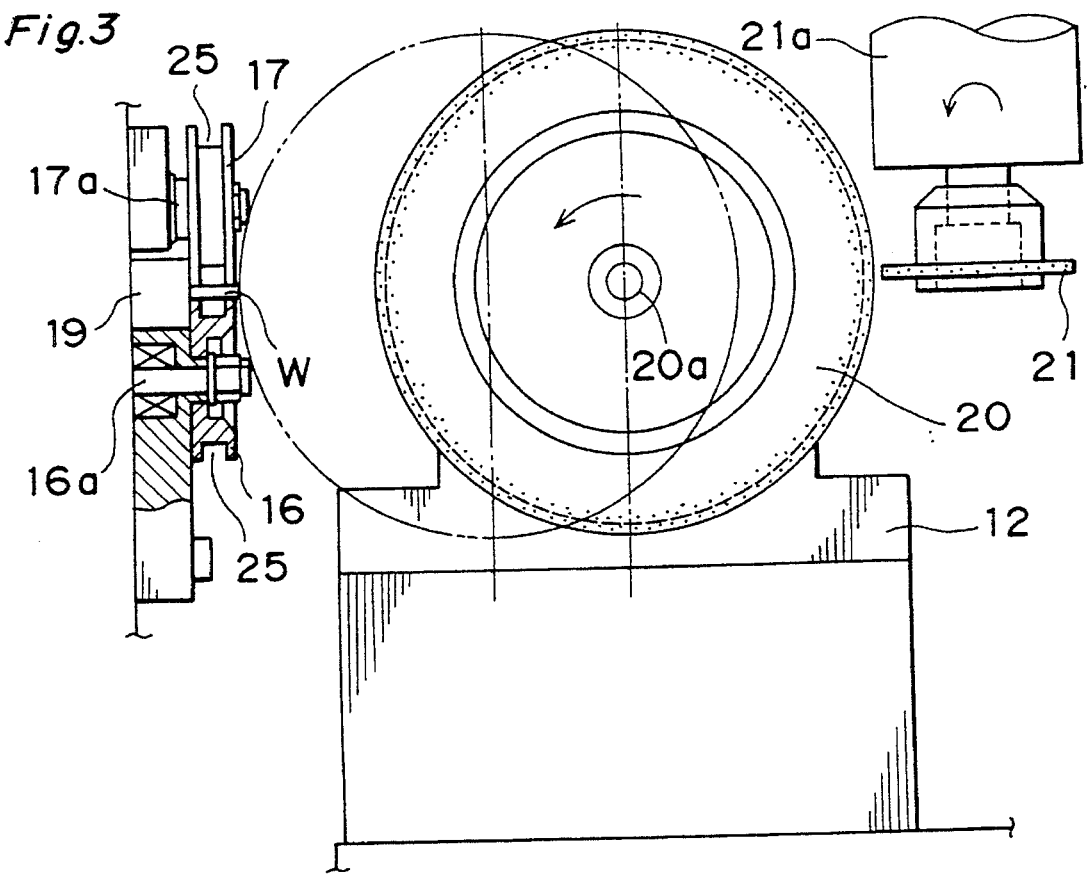
FIG. 3 is a side view of a part of the grinder shown in FIG. 1.
Figure 5:
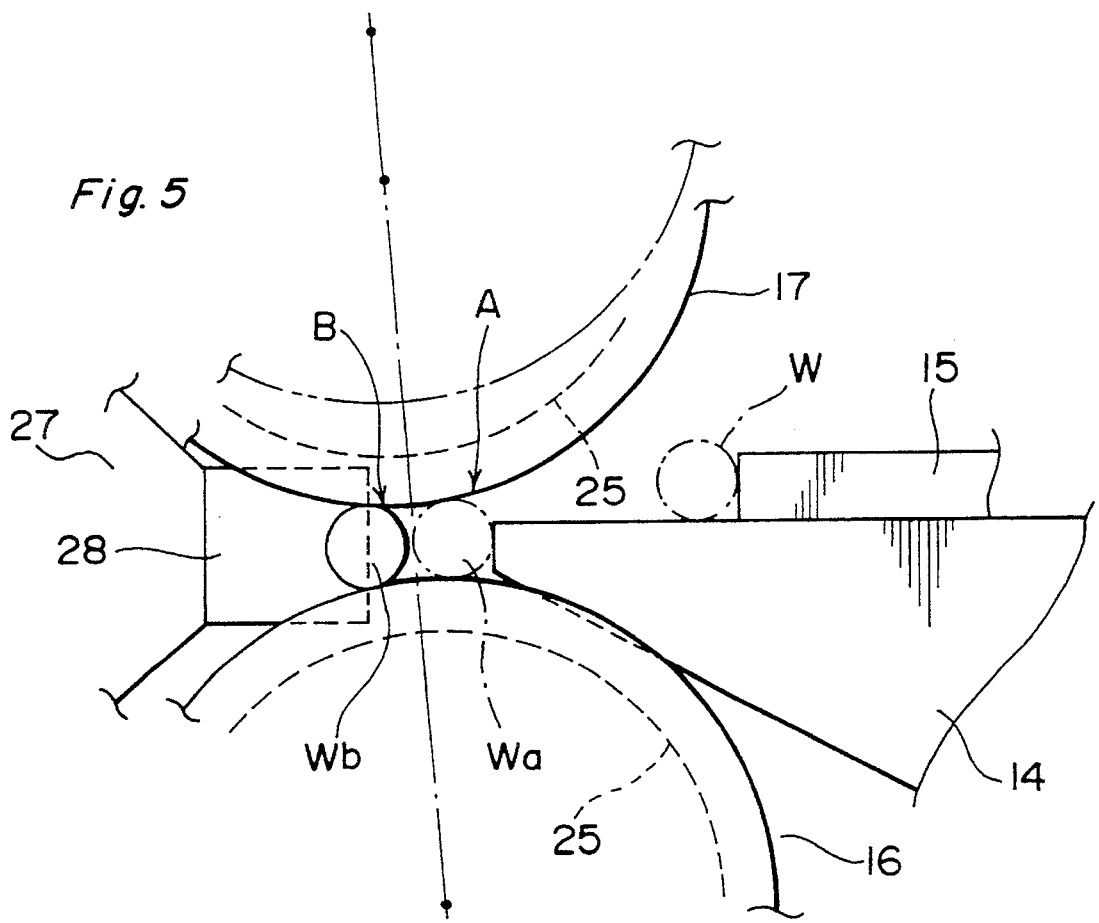
FIG. 5 is an enlarged view showing a grinding position A of FIG. 2.

The aforementioned support roll 16 and the pressure roll 17 are rotatably mounted around shafts 16a and 17a, respectively. Both the rolls 16 and 17 are rotated at same speed in the same direction by a motor 24 via belts 23. The shaft 17a is arranged as slightly tilted in a plane parallel to the direction of the axial center of the rod-shaped workpiece W so that the workpiece W can advance toward the backing plate 19 while rotating the rod-shaped workpiece W. An escape groove 25 is provided around a center portion of the entire circumference of both the rolls 16 and 17 (refer to FIG. 3). The escape groove 25 as shown in FIG. 5 has a width capable of allowing entry of the shoe 14 and a suction pad 28 as described hereinafter into the groove 25 without being put in contact with the walls of the groove 25. The pressure roll 17 has a structure in which it is put in or out of contact with the support roll 16 by being pivoted around an axis X by a driving operation of a cylinder 26.

Figure 2:
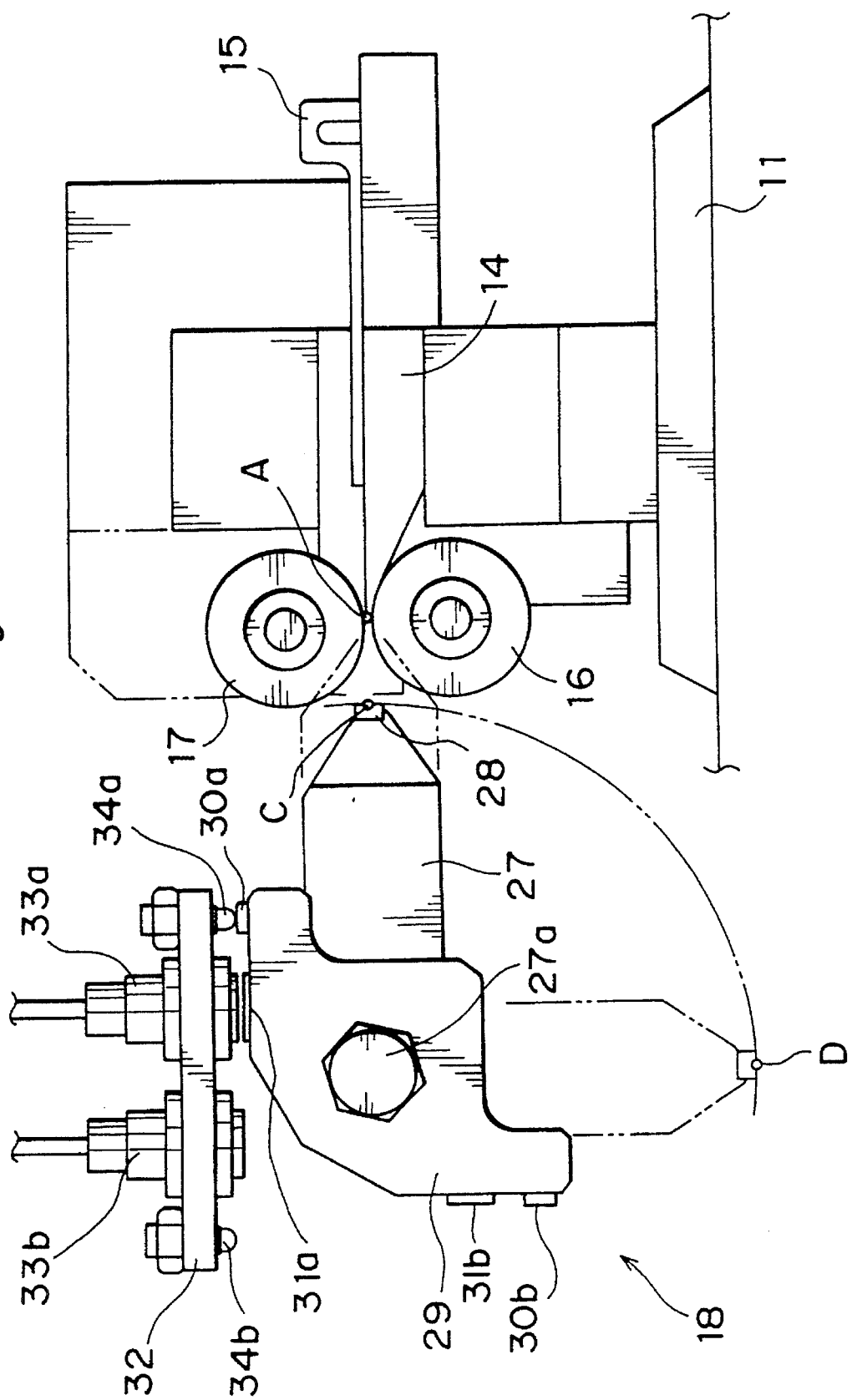
FIG. 2 is a front view of a part of the grinder shown in FIG. 1.

The aforementioned suction pad mechanism 18 has a structure as shown in FIG. 2, in which a suction pad 28 is fixed to a front end of an arm 27 which is capable of extending and turning around a shaft 27a. The suction pad 28 has a structure in which the rod-shaped workpiece W is attracted by suction due to absorbing air. The arm 27 is integrated with an approximately L-shaped guide member 29 provided around the shaft 27a. Pads 30a and 30b are provided at both ends of the guide member 29. Detection sections 31a and 31b are provided in the vicinity of the pads 30a and 30b. A support plate 32 is arranged in the vicinity of the guide member 29. A pair of sensors 33a and 33b and a pair of pad receiving sections 34a and 34b are fixed on the support plate 32. The arm 27 rotates within an angle range of about 90° in which the pads 30a and 30b abut against the pad receiving sections 34a and 34b, and the detection sections 31a and 31b are detected by the sensors 33a and 33b in each stop position.

Figure 4:
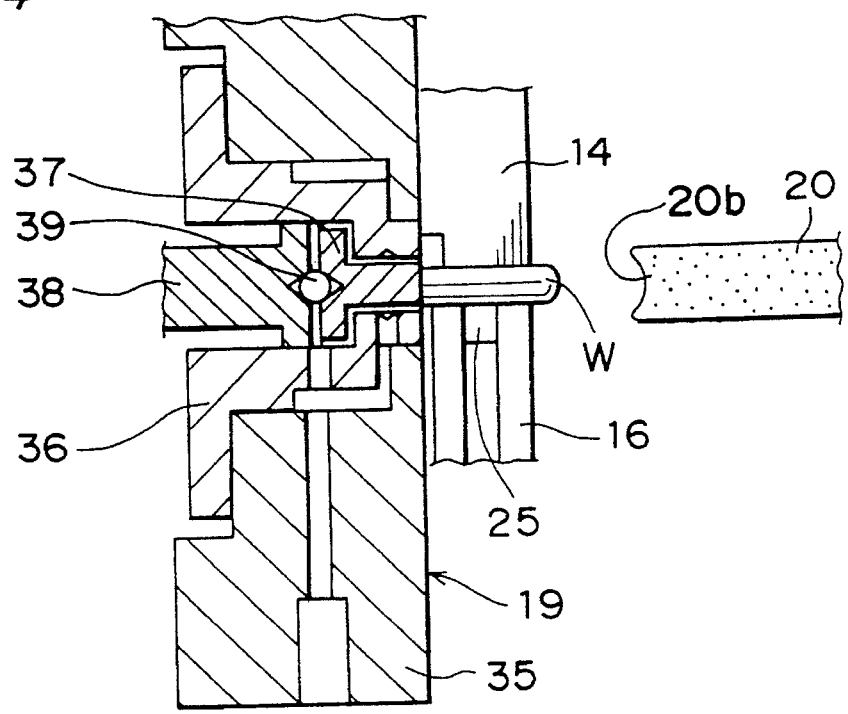
FIG. 4 is a partially sectional plane view showing a part around a backing plate shown in FIG. 3.

The aforementioned backing plate 19 abuts against the rear end surface of the rod-shaped workpiece W so as to position the rod-shaped workpiece W in the direction of the axial center. As shown in FIG. 4, the backing plate 19 has a structure in which a floating plate 37 is stored in a housing 36 inside a main body 35 so that a specified gap dimension is assured, and the floating plate 37 is swingably supported by a sphere 39 supported by a support member 38. According to the backing plate 19, the floating plate 37 swings according to the variation of perpendicularity of the rear end surface of the rod-shaped workpiece W with respect to the axial center, so that they are put in surface contact with each other. Then, according to the rotation of the rod-shaped workpiece W, the floating plate 37 rotates together therewith, so that the rotation is stabilized.

The aforementioned grinding wheel 20 (diameter: 120 mm) is comprised of a circular flat-plate-shaped diamond grinding stone. The grinding wheel 20 is made to rotate around a rotary drive shaft 20a by a driving operation of a motor (not shown). The rotary drive shaft 20a is provided perpendicularly to the axial center of the rod-shaped workpiece W supplied into the processing position A. The grinding wheel 20 can be put in and out of contact with the rod-shaped workpiece W by horizontally moving the grinding wheel feed base 12 by a driving operation of a servomotor 12a. The grinding wheel 20 is provided in a position where it has no interference with the other sections of the grinder, and therefore the outer diameter dimension can be increased, thereby allowing a long life to be assured. Further, a circumferential surface 20b of the grinding wheel 20 is formed with a sectionally arch-shaped groove (refer to FIG. 4), and the curvature thereof is the same as the curvature of the finish spherical surface of the rod-shaped workpiece W to be ground.

The aforementioned dress forming grindstone 21 has a structure in which diamond grinding stone particles are integrated in a body by a metal bond or the like. The dress forming grindstone 21 is made to rotate around a rotary drive shaft by a driving operation of a motor 21a. The rotary drive shaft is provided perpendicularly to the rotary drive shaft 20a of the grinding wheel 20.

Next, operation of the rod-shaped workpiece grinder having the above-mentioned construction will be described.

First, in a state in which the pressure roll 17 is made to retreat upward as indicated by a tow-dot chain line in FIG. 5, an unprocessed rod-shaped workpiece W (indicated by a one-dot chain line in FIG. 5) is supplied onto the shoe 14 in front of the front end surface of the loading plate 15. Then, by sliding the loading plate 15 and pressing the circumferential surface of the rod-shaped workpiece W with its front end surface, the rod-shaped workpiece W is supplied into the processing position A (in FIG. 5, the rod-shaped workpiece supplied into the processing position A is indicated by an unprocessed workpiece Wa).

Subsequently, the pressure roll 17 is moved down to support the circumferential surface of the unprocessed workpiece Wa by means of the shoe 14, the support roll 16 and the pressure roll 17, thereby positioning the unprocessed workpiece Wa in the processing position A. Then, by driving the motor 24 to rotate the support roll 16 and the pressure roll 17 via the belt 23, the unprocessed workpiece Wa is rotated (in the present embodiment, the motor 24 is driven at a rotating speed of 600 rpm, so that a peripheral velocity of the unprocessed workpiece Wa is 4.7 m/min). The shaft 16a of the support roll 16 is provided as slightly tilted with respect to the direction of the axial center of the unprocessed workpiece Wa as described hereinbefore. Therefore, the unprocessed workpiece Wa receives a propelling force from the support roll 16, and its rear end surface is pressed against the backing plate 19. Further, the unprocessed workpiece Wa is supported at its circumferential surface by the shoe 14 and both the rolls 16 and 17, and thereby it rotates by its circumferential surface. Therefore, the center of rotation of the unprocessed workpiece Wa coincides with its axial center with high accuracy (in the present embodiment, the misalignment amount $\alpha$ is not greater than 10 μm, i.e., one fifth of that of the prior art).

Subsequently, the grinding wheel 20 is rotated by the driving operation of the unshown motor (in the present embodiment, the grinding wheel 20 is driven at a rotating speed of 12000 rpm, so that the peripheral velocity of the grinding wheel is 4524 m/min). Then, by driving the servomotor 12a to horizontally move the grinding wheel feed base 12, the grinding wheel 20 is put close to the unprocessed workpiece Wa, and then the circumferential surface 20b is put in abrasive contact with the front end surface of the unprocessed workpiece Wa (plunge grinding). Further, at the same time, a coolant is supplied to the abrading portion via a nozzle (not shown). With the above-mentioned operation, the front end surface of the unprocessed workpiece Wa is ground into a spherical surface by the circumferential surface 20b of the grinding wheel 20. Since the front end surface of the unprocessed workpiece Wa and the circumferential surface 20b of the grinding wheel 20 are put in line contact with each other, the coolant surely reaches the grinding portion, so that a good grinding condition can be obtained.

Furthermore, the grinding wheel 20 is made to have a structure in which its circumferential surface has a sectionally arch-shaped groove shape as described hereinbefore, and is moved in parallel as it is without being tilted with respect to the unprocessed workpiece Wa. Therefore, the above-mentioned arrangement obviates the need of the work for adjusting the tilt angle of the grinding wheel 20, thereby allowing the grinding process to be started in a short time.

When the spherical surface grinding of the unprocessed workpiece Wa is thus completed, the pressure roll 17 is separated apart from the support roll 16, and the arm 27 is made to advance from a stand-by position C (refer to FIG. 2) to a receiving position B. The position in which the suction pad 28 holds the processed workpiece Wb is a position opposite from the processing position A with respect to a straight line that connects the shafts 16a and 17a of both the rolls 16 and 17.

Subsequently, when the next unprocessed workpiece Wa is supplied into the processing position A in the same manner as described above, the processed workpiece Wb is pushed to the position B by the unprocessed workpiece Wa that is supplied into the processing position A by the loading plate 15. Then, the processed workpiece Wb is attracted by suction and held by the suction pad 28. With the above-mentioned operation, the supplied unprocessed workpiece Wa is surely prevented from erroneously passing through the processing position A.

Subsequently, by making the arm 27 retreat from the receiving position B to the stand-by position C and thereafter pivot into a discharge position D, the processed workpiece Wb is discharged. Meanwhile, the unprocessed workpiece Wa is positioned in the processing position A by the movement of the pressure roll 17, and the spherical surface grinding is then performed in the same manner as described above.

When the grinding wheel 20 is worn away, a dress forming process is performed by the dress forming grindstone 21. In the dress forming process, by driving the servomotor 12a to move the grinding wheel feed base 12, the grinding wheel 20 is put close to the dress forming grindstone 21. Then, the dress forming grindstone 21 having a diameter of the same curvature as that of the front end spherical surface of the rod-shaped workpiece W is put in abrasive contact with the circumferential surface of the grinding wheel 20. Further, when the dress forming grindstone 21 is choked up, a dressing grindstone 22 is put in abrasive contact with the dress forming grindstone 21 to dress the latter.

As described above, according to the first embodiment, there can be automatically performed supply, grinding and discharge of the rod-shaped workpiece W. In each of the works, no troublesome adjustment is required, and therefore the time necessary for each of the works can be remarkably reduced to achieve a high efficiency (in the present embodiment, the cycle time was 15 seconds, which is 1/2.6 to 1/3.3 of that of the prior art).

Figure 6A:
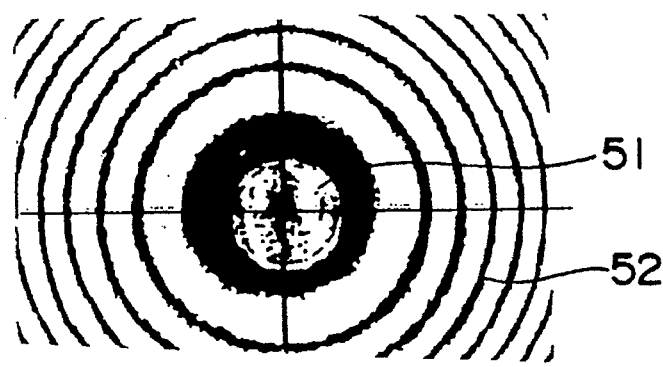
FIG. 6A is interference fringes showing a grinding finish condition of a rod-shaped workpiece by the grinder according to the present invention.
Figure 6B:
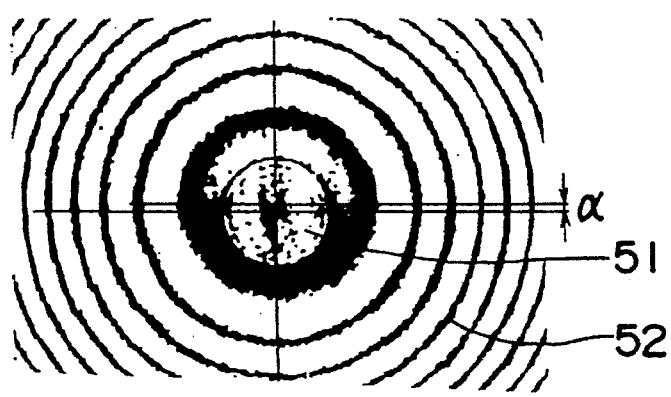
FIGS. 6B and 6C are interference fringes showing a grinding finish condition of a rod-shaped workpiece by the grinder according to the prior art.
Figure 6C:
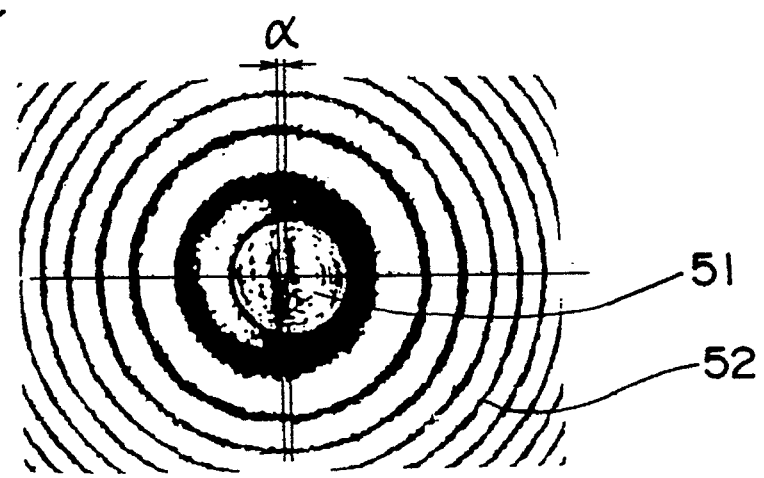

FIGS. 6A, 6B and 6C show interference fringes of the front end spherical surface of the rod-shaped workpiece W by Fizeau interferometer, where the center circle indicates an optical fiber insertion hole 51, and circles formed therearound indicates contour lines 52 with respect to the center of the spherical surface formed at the front end of the rod-shaped workpiece W. According to the first embodiment, it was found that the position of the optical fiber insertion hole 51, i.e., the axial center of the rod-shaped workpiece W was aligned with the center of the spherical surface with high accuracy as shown in FIG. 6A. In contrast to the above, when the rod-shaped workpiece W is held by the diaphragm chuck 1 as in the prior art, as shown in FIGS. 6B and 6C, it was found that a misalignment (the amount of misalignment is indicated by α in the figures) took place between the axial center of the rod-shaped workpiece W and the center of the front end spherical surface. That is, according to the grinder of the present embodiment, it is evident that the front end spherical surface of the rod-shaped workpiece W can be ground with high accuracy.

Second Embodiment

Figure 7A:
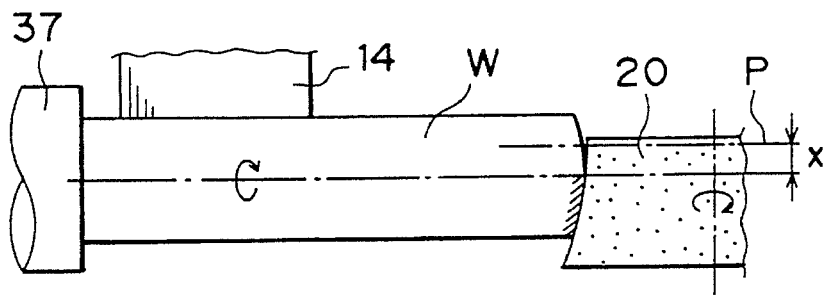
FIGS. 7A and 7B are plane views of a part showing a grinding condition achieved by a grinding wheel according to a second embodiment of the present invention having different shapes from that of grinding wheel shown in FIG. 4.
Figure 7B:
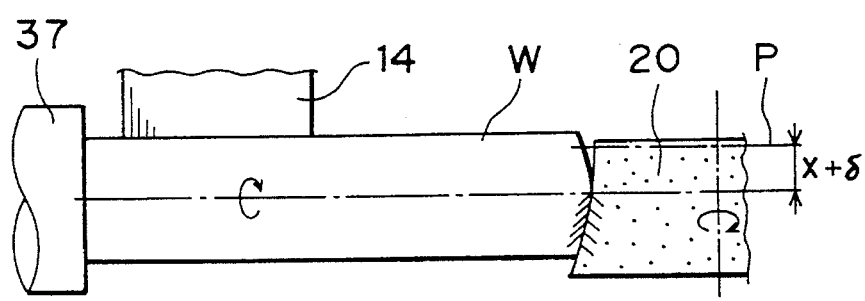

FIG. 7 shows a second embodiment of rod-shaped workpiece grinder according to the present invention. The circumferential surface of the grinding wheel 20 is formed with a sectionally arch-shaped groove in the same manner as in the first embodiment. However, along a plane separated apart by a specified dimension from a plane (grinding wheel center plane) P which expands through the deepest position, a substantially half portion which does not include the grinding wheel center surface P is removed.

According to the second embodiment, the grinding is performed by rotating the rod-shaped workpiece W around its axial center in the same manner as in the first embodiment, and putting the circumferential surface 20b of the grinding wheel 20 in abrasive contact with the front end surface of the rod-shaped workpiece W while rotating the grinding wheel 20 around the rotary drive shaft 20a that is perpendicular to the axial center.

In the present case, the grinding wheel 20 is set as offset in position by a specified dimension x (in the present embodiment, the amount of offset is 0.01 to 0.15 mm) so that the grinding wheel center plane P oversteps to some extent the axial center of the rod-shaped workpiece W. The dimension x is to surely achieve the grinding of the spherical surface even if the setting position of the grinding wheel 20 is displaced to some extent in the direction of its axis of rotation.

That is, when the misalignment amount is ±δ (in FIG. 6, (+) represents the upper side, while (−) represents the lower side), by setting the dimension x so that a relation of x>δ holds, the grinding center plane P does not overstep the axial center of the rod-shaped workpiece W, and the grinding can be achieved by surely putting the grinding wheel in line contact with the half of the front end of the rod-shaped workpiece W. Further, as shown in FIG. 6B, even when a grinding wheel 20 is displaced upward (distance between the axial center of the rod-shaped workpiece W and the grinding center plane P: x+δ), the grinding can be achieved by surely putting the grinding wheel in line contact with the rod-shaped workpiece W within a specified range inclining the spherical center of the rod-shaped workpiece W, meaning that the spherical center does not become indefinite.

Furthermore, the circumferential grinding surface 20b of the grinding wheel 20 is put in line contact with the half of the front end spherical surface of the rod-shaped workpiece W, meaning that a reduced grinding resistance is achieved. Thereby, a fluctuation in the grinding process is reduced, and a good grinding condition can be obtained.

Therefore, the grinding of the rod-shaped workpiece W can be achieved so that the center of the spherical surface becomes definite, and the center can be aligned with the axial center of the rod-shaped workpiece W with high accuracy.

Figure 8:
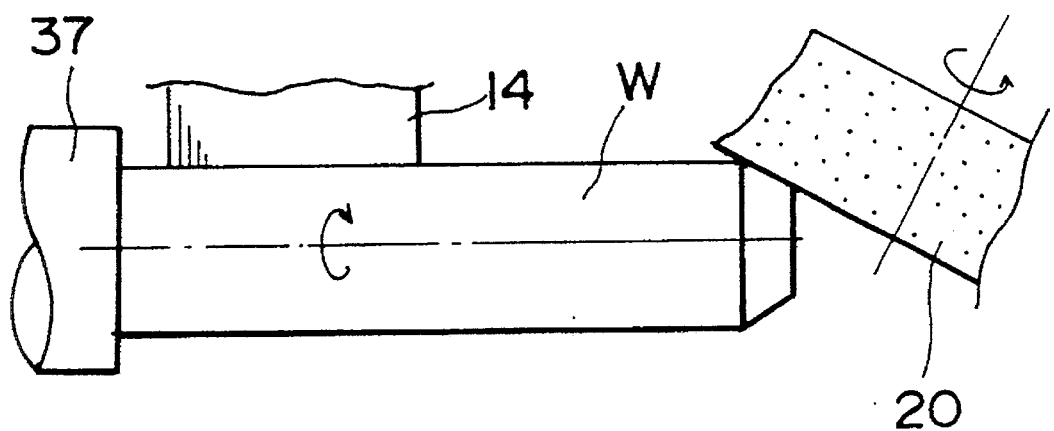
FIG. 8 is a plane view of a part showing a state in which the grinding wheel is used in another style.
Figure 9:
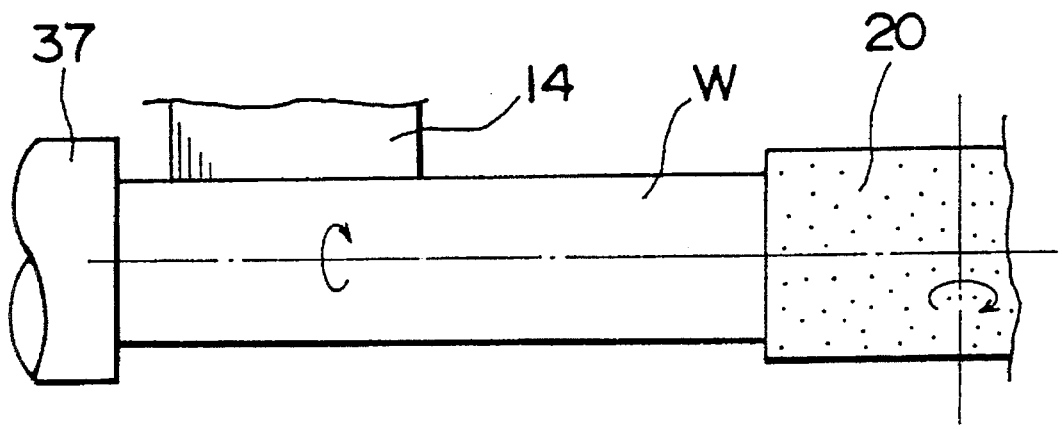
FIG. 9 is a plane view of a part showing a grinding condition achieved by a grinding wheel having another shape.

In the aforementioned embodiment, there has been described the case where the front end surface of the rod-shaped workpiece W is ground into a spherical surface. However, in a manner as shown in FIG. 8, by tilting the grinding wheel 20 and putting its peripheral edge portion in abrasive contact with the rod-shaped workpiece W, a conical escape surface can be formed on the rod-shaped workpiece W. Further, in a manner as shown in FIG. 9, by keeping intact the cylindrical circumferential surface of the grinding wheel 20 instead of forming any groove on the circumferential surface, and putting the grinding wheel 20 in abrasive contact with the front end surface of the rod-shaped workpiece W in the same manner as in the aforementioned embodiment, the front end surface of the workpiece can be ground flatly. In such a case, by reciprocating the dress forming grindstone 21 in parallel with the rotary drive shaft 20a of the grinding wheel 20, the circumferential surface of the grinding wheel 20 is formed in a cylindrical shape. Further, with the circumferential surface of the grinding wheel formed with a sectionally arch-shaped groove, the grinding wheel center plane P may be offset so as to use the half of the grinding wheel in a manner as in the second embodiment. According to the above-mentioned arrangement, the cycle of replacing the grinding wheel 20 can be further prolonged.

Detail of Backing Plate

Figure 10:
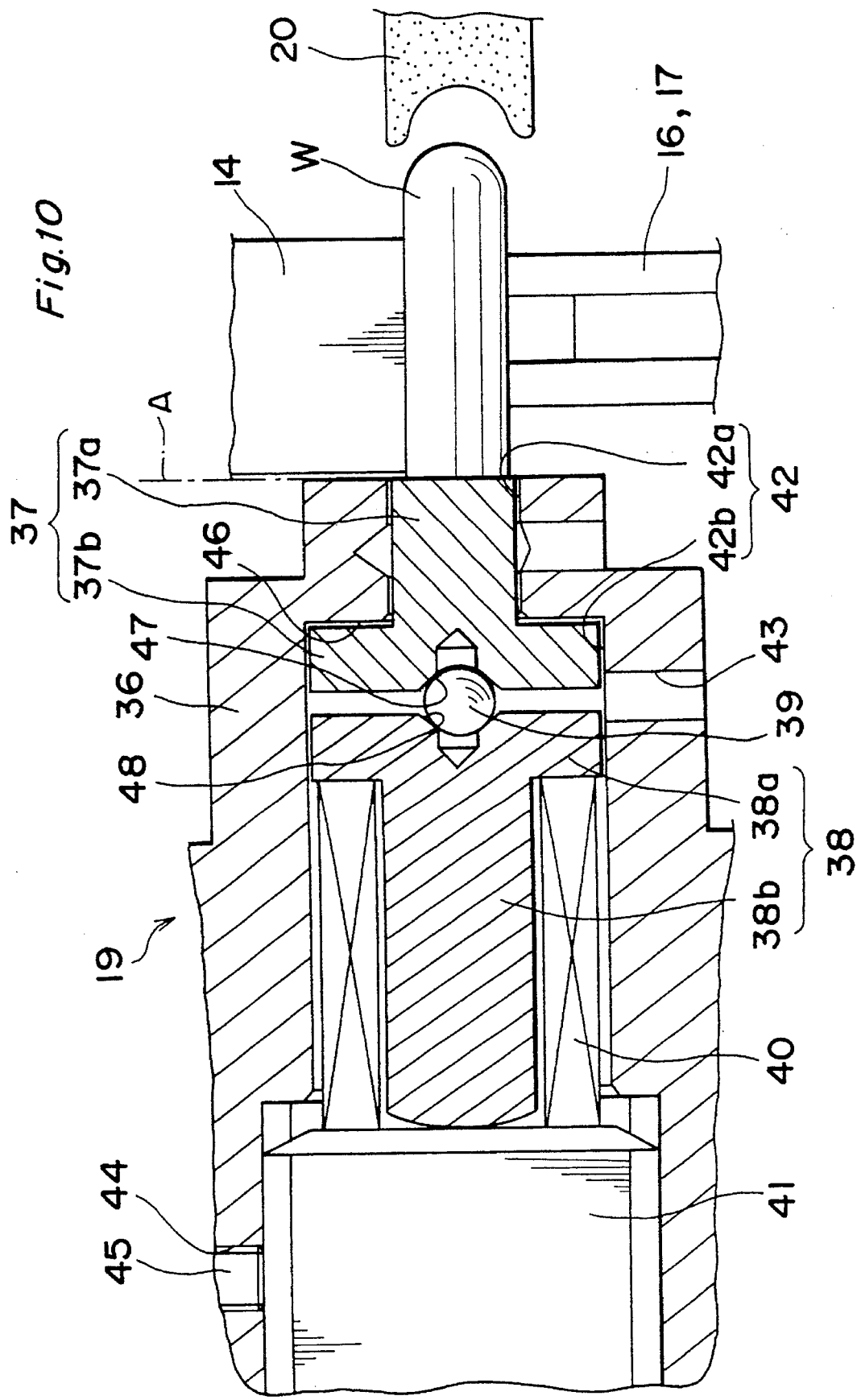
FIG. 10 is an enlarged sectional plane view of the backing plate shown in FIG. 4.

Referring to FIG. 10, the backing plate 19 will be further described in detail.

The present backing plate 19 is substantially comprised of a housing 36, a floating plate 37, a sphere 39, a support member 38, a spring 40 and an adjusting screw 41.

The housing 36 has a guide cavity 42 where a small-diameter cavity 42a and a large-diameter cavity 42b are formed continuously from its front end surface. An oil mist air supply hole 43 communicated with the large-diameter cavity 42b in the vicinity of the small-diameter cavity 42a is formed through a side surface on the front end side of the housing 36. Further, a screw hole 44 communicated with the large-diameter cavity 42b is formed on the rear end side of the housing 36, and the screw hole 44 is engaged with a setscrew 45 for positioning the adjusting screw 41 as described below.

The floating plate 37 is formed by forming a super-hard material in a step-like shape composed of a small-diameter section 37a and a large-diameter section 37b. The floating plate 37 is arranged so that a small gap is formed between the floating plate 37 and the small-diameter cavity 42a and a part of the large-diameter cavity 42b continued from the small-diameter cavity 42a of the guide cavity 42. The small-diameter section 37a of the floating plate 37 is longer than the small-diameter cavity 42a, and protrudes slightly from the front surface of the housing 36 when the large-diameter section 37b is made to abut against an end surface 46. On the other hand, a conical first support recess 47 for positioning the sphere 39 is formed in a center portion on a rear surface of the large-diameter section 37b of the floating plate 37.

The sphere 39 is formed of ceramics or the like. The sphere 39 is to swingably support the floating plate 37 in every direction.

The support member 38 is composed of a collar section 38a and a shaft section 38b. The collar section 38a is guided along the inner surface of the large-diameter cavity 42b of the housing 36. In its center portion, a second support recess 48 having the same shape as that of the first support recess 47 formed on the rear end surface of the floating plate 37 is formed to support the sphere 39. Further, a rear end surface of the shaft section 38b is formed in a spherical shape, so that it is put in point contact with an end surface of the adjusting screw 41 described below.

The spring 40 is provided between the collar section 38a of the support member 38 and the adjusting screw 41 described below, and operates to urge the floating plate 37 via the sphere 39 in a direction in which the front end surface of the floating plate 37 protrudes from the front end surface of the housing 36.

The adjusting screw 41 is put in meshing engagement with the large-diameter cavity 42b from the rear end of the housing 36, and the front end surface is made to abut against the spherical end surface of the shaft section 38b of the support member 38. Then, by adjusting the meshing engagement position of the adjusting screw 41, a floating amount of the floating plate 37 can be adjusted via the sphere 39.

The backing plate 19 having the above-mentioned construction is assembled in a manner as follows.

That is, the floating plate 37, the sphere 39, the support member 38 and the spring 40 are stored in this order inside the guide cavity 42 from the rear end of the housing 36, and the adjusting screw 41 is put in meshing engagement with the large-diameter cavity 42b. In the above-mentioned state, the floating plate 37 cannot float by the successive abutment of the sphere 39, the support member 38, the spring 40 and the adjusting screw 41 against the rear end surface thereof, and is protruding from the housing 36 (in the present embodiment, the protruding amount is set to 20 μm).

Subsequently, by adjusting the meshing engagement position of the adjusting screw 41, the floating amount of the floating plate 37 is adjusted. In this adjustment, firstly a processed rod-shaped workpiece W of which front end has been processed into a spherical surface is held by the shoe 14 and a pair of rolls 16 and 17, and the rear end surface of the rod-shaped workpiece W is made to abut against the floating plate 37. Then, by putting a mini tester (2 μm per scale) in contact with the front end spherical surface of the rod-shaped workpiece W, and loosening the adjusting screw 41 while driving the rolls 16 and 17 to rotate, the rod-shaped workpiece W is made to retreat (20 μm). In the above place, the dimension of retreat can be freely set depending on how much the floating plate 37 is made able to swing. It is to be noted that, in order to assure a swing angle of the floating plate 37, a gap having a specified dimension is required between the small-diameter section 37a of the floating plate 37 and the small-diameter cavity 42a of the housing 36 and between the large-diameter section 37b of the floating plate 37 and the large-diameter cavity 42b of the housing 36.

Subsequently, when the floating amount of the floating plate 37 is determined, the setscrew 45 is screwed in the screw hole 44 to position the adjusting screw 41.

In the thus assembled backing plate 19, a specified gap is defined between the floating plate 37 and the support member 38 by the sphere 39, and oil is supplied to the gap through the oil mist air supply hole 43 formed at the housing 36, so that the swing of the floating plate 37 can be naturally smoothly performed.

It is now assumed that the floating plate 37 is fixed for better understanding of the operation of the backing plate 19 having the above-mentioned construction.

When the perpendicularity of the rear end surface of the rod-shaped workpiece (ferrule) W with respect to its axial center, under the influence of the perpendicularity between the shoe 4 and the floating plate 37 when they are mounted, the front end of the rod-shaped workpiece W may vibrate as it advances and retreats within the range δ as shown in FIGS. 11A and 11B while the workpiece makes one turn, or the end surface of the rod-shaped workpiece W may be worn away by being partially put in abrasive contact with the backing plate 7. As a result, the grinding condition becomes unstable, and this causes deterioration of the processing accuracy. In concrete, when the perpendicularity of the rod-shaped workpiece W deviates from 0.1 μm/2.5 mm, and the perpendicularity of the shoe 4 with respect to the backing plate 7 deviates from 0.1 μm/50 mm, the processing accuracy deteriorates. FIG. 12 shows an interference fringe of equal thickness which has appeared on the front end surface of the workpiece W as a result of using a flatness tester. It can be found that the interference fringes 52 of contour lines on the front end spherical surface of the workpiece W is not concentric, meaning that the spherical surface does not have a high accuracy. Therefore, it can be considered to achieve preprocessing so that the perpendicularity of the end surface of the rod-shaped workpiece W with respect to its axial center is increased. However, such an arrangement requires high-accuracy processing in another process, and this causes a problem in terms of cost.

Figure 13A:
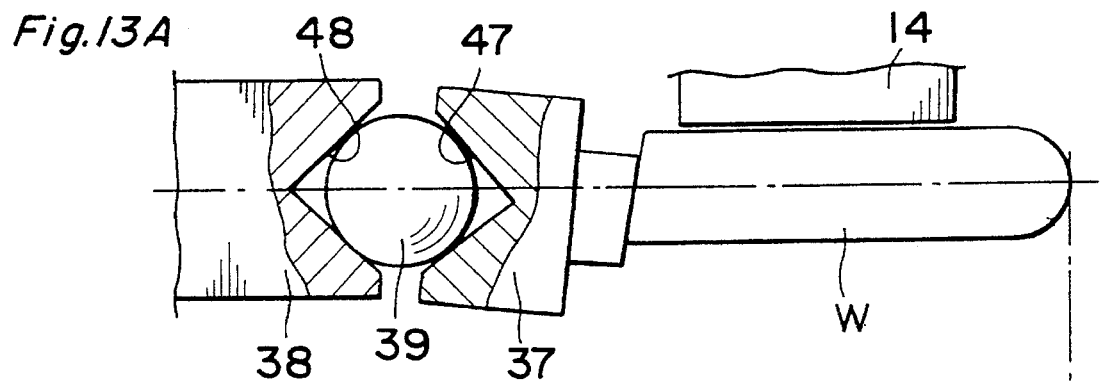
FIGS. 13A and 13B are plane views showing a state in which the floating plate shown in FIG. 10 swings.
Figure 13B:
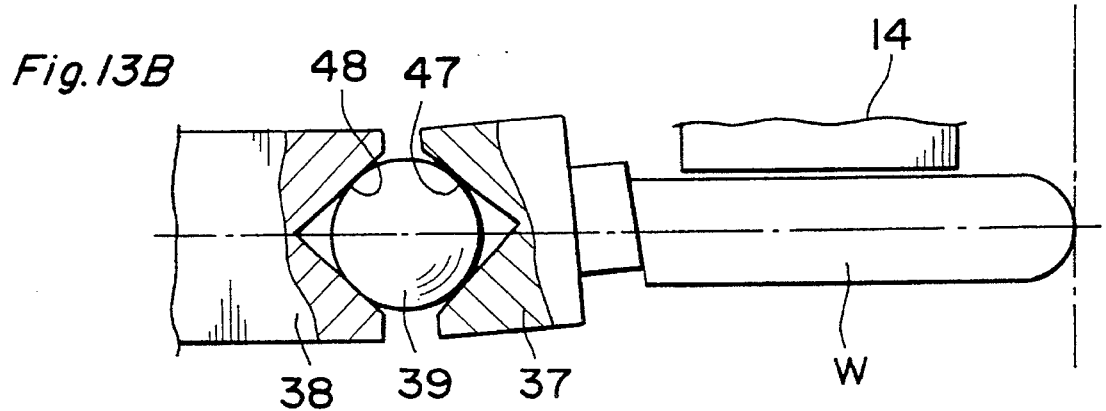

In contrast to the above, the floating plate 37 of the backing plate 19 according to the present invention is supported swingably in every direction by virtue of the sphere 39 as shown in FIG. 13A. Therefore, the floating plate 37 swings so as to surely achieve a surface contact regardless of the accuracy of perpendicularity of the end surface of the rod-shaped workpiece W, so that the floating plate 37 and the rod-shaped workpiece W rotate in an integrated body.

In the present case, the floating plate 37 is urged by the spring 40 in a direction in which it protrudes from the housing 36 via the support member 38 and the sphere 39. With the above-mentioned arrangement, the state of surface contact with the rod-shaped workpiece W can be immediately obtained, so that the time to the start of the grinding process can be reduced. Furthermore, even when a great floating amount is provided, the floating plate 37 does not twist inside the guide cavity 42 of the housing 36 when the floating plate 37 is pushed in by the rod-shaped workpiece W, so that floating of the floating plate 37 can be achieved always in a good condition.

The floating plate 37 rotates together with the rod-shaped workpiece W around the axial center of the rod-shaped workpiece W with the center of the sphere 39 as a norm, so that the position of the front end of the rod-shaped workpiece W does not change. Therefore, the spherical surface grinding of the rod-shaped workpiece W can be performed in a good condition, so that the front end surface of the rod-shaped workpiece W can be formed in a spherical shape with high accuracy.

Figure 14:
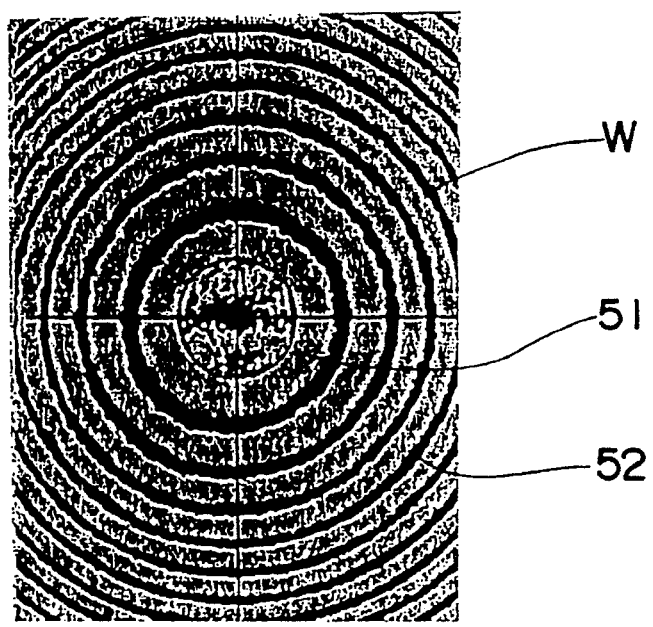
FIG. 14 is interference fringes showing a grinding finish condition of a rod-shaped workpiece by the grinder having the floating plate shown in FIG. 10.

FIG. 14 shows an interference fringe of equal thickness on the front end surface of the rod-shaped workpiece (ferrule) W which has undergone the spherical surface grinding process. According to this, it can be found that the interference fringe is concentric and the front end surface of the workpiece W has a high-accuracy spherical shape. In contrast to the above, in the case where the conventional backing plate is used, the spherical shape has been distorted as shown in FIG. 12.

Figure 15:
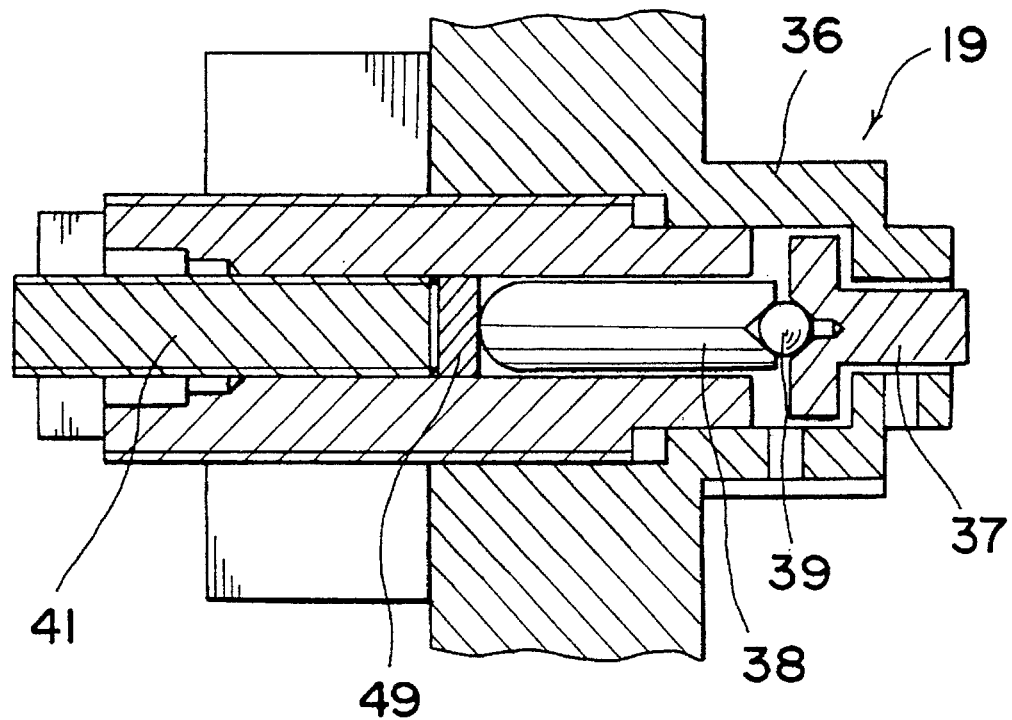
FIG. 15 is a sectional plane view showing a backing plate of another embodiment.
Figure 16:
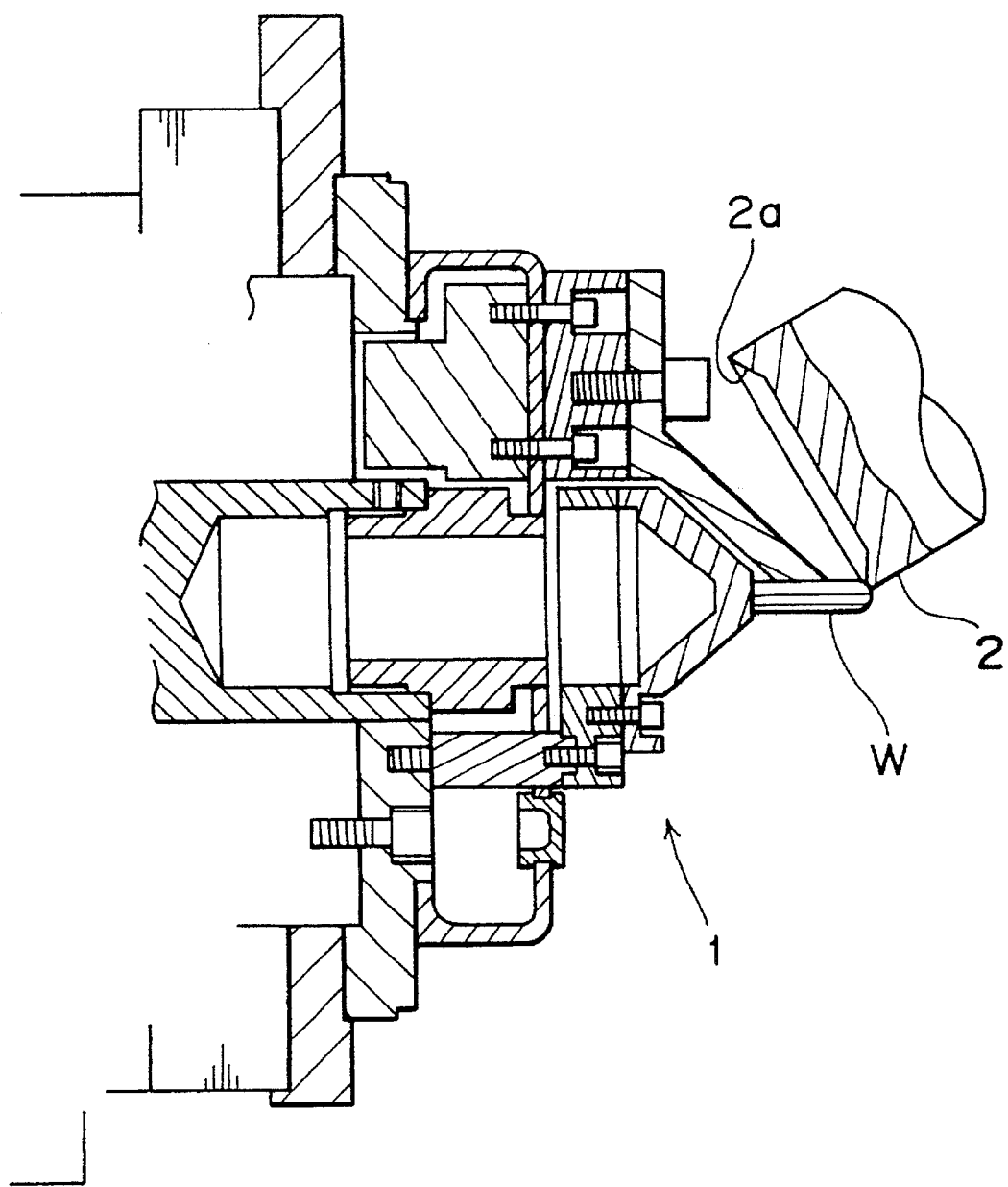
FIG. 16 is a sectional plane view of a prior art grinder.

In the aforementioned embodiments, the floating plate 37 is urged by the spring 40 via the sphere 39 and the support member 38. However, as shown in FIG. 15, there may be a construction in which the support member 38 is supported directly by the adjusting screw 41 via an intermediate plate 48.

Although the present invention has been fully described by way of the examples with reference to the accompanying drawing, it is to be noted here that various changes and modifications will be apparent to those skilled in the art. Therefore, unless such changes and modifications otherwise depart from the spirit and scope of the present invention, they should be construed as being included therein.

What is claimed is:

1. A rod-shaped workpiece grinder comprising:

a shoe which abuts against a circumferential surface of a rod-shaped workpiece supplied in a grinding position;

a pair of rolls which rotatably abut against the circumferential surface of said rod-shaped workpiece, at least one of the rolls being able to be put in and out of contact with said rod-shaped workpiece, at least one of the rolls being driven to rotate;

a backing plate which abuts against a rear end surface of said rod-shaped workpiece; and a grinding wheel which puts its circumferential surface in abrasive contact with a front end surface of said rod-shaped workpiece by being driven to rotate to grind the front end surface of said rod-shaped workpiece.

2. A rod-shaped workpiece grinder as claimed in claim 1, wherein said circumferential surface of said grinding wheel is formed with a sectionally arch-shaped groove.

3. A rod-shaped workpiece grinder as claimed in claim 2, wherein a grinding wheel center plane which passes through a portion farthest from said circumferential surface and is perpendicular to an axis of rotation of said grinding wheel is offset by a specified dimension from an axial center of said rod-shaped workpiece.

4. A rod-shaped workpiece grinder as claimed in claim 3, wherein an approximately half of said grinding wheel is removed axially along a vicinity of said grinding wheel center plane.

5. A rod-shaped workpiece grinder as claimed in claim 1, wherein said backing plate comprises:

a housing having a guide cavity;

a floating plate which is arranged inside said guide cavity of said housing with interposition of a small gap, and has a front end surface against which the rear end portion of said rod-shaped workpiece abuts and a rear end surface formed with a support recess portion;

a sphere which is placed in said support recess portion of the rear end surface of said floating plate and operates to swingably support said floating plate; and a support member which is provided inside said housing and operates to support said sphere between the support member and said floating plate.

6. A rod-shaped workpiece grinder as claimed in claim 5, wherein a spring for urging said floating plate in a direction in which said floating plate protrudes from said housing via said support member is provided inside said housing.

7. A rod-shaped workpiece grinder as claimed in claim 5 or 6, further comprising a floating amount adjusting screw which abuts against the rear end surface of said support member and operates to adjust via said sphere a positional relation in the direction of the axial center of said floating plate with respect to said housing.

\* \* \* \* \*